US009286572B2

(12) United States Patent
de Anda Fast

(10) Patent No.: US 9,286,572 B2
(45) Date of Patent: Mar. 15, 2016

(54) PSEUDO-GENETIC META-KNOWLEDGE ARTIFICIAL INTELLIGENCE SYSTEMS AND METHODS

(71) Applicant: Ether Dynamics Corporation, Chino Hills, CA (US)

(72) Inventor: Dominic de Anda Fast, Centennial, CO (US)

(73) Assignee: Ether Dynamics Corporation, Chino Hills, CA (US)

( * ) Notice: Subject to any disclaimer, the term of this patent is extended or adjusted under 35 U.S.C. 154(b) by 444 days.

(21) Appl. No.: 13/897,664

(22) Filed: May 20, 2013

(65) Prior Publication Data

US 2014/0032456 A1   Jan. 30, 2014

Related U.S. Application Data

(63) Continuation of application No. 13/462,683, filed on May 2, 2012, now Pat. No. 8,447,419.

(51) Int. Cl.
  *G05B 15/00*  (2006.01)
  *G06N 99/00*  (2010.01)
  *G06N 3/12*  (2006.01)
  *G05B 13/02*  (2006.01)

(52) U.S. Cl.
  CPC .......... *G06N 99/005* (2013.01); *G05B 13/0265* (2013.01); *G06N 3/126* (2013.01)

(58) Field of Classification Search
  CPC ... G06N 99/005; G06N 3/126; G05B 13/0265
  USPC .......................................................... 700/83
  See application file for complete search history.

(56) References Cited

U.S. PATENT DOCUMENTS

| 5,240,207 | A | 8/1993 | Eiband et al. |
| 6,038,493 | A | 3/2000 | Tow |
| 6,249,780 | B1* | 6/2001 | Mizokawa ........... G05B 19/042 706/11 |
| 6,415,272 | B1 | 7/2002 | Ulyanov |

(Continued)

OTHER PUBLICATIONS

Tom M. Mitchell, Machine Learning (McGraw-Hill Science/Engineering/Math eds., Mar. 1, 1997). This reference is of record in U.S. Appl. No. 13/462,683, filed May 2, 2012, which is the parent of this continuation application.

(Continued)

*Primary Examiner* — Robert Fennema
*Assistant Examiner* — Sivalingam Sivanesan
(74) *Attorney, Agent, or Firm* — Knobbe Martens Olson & Bear LLP

(57) ABSTRACT

Systems and methods for artificially intelligent physical and virtual actors including pseudo-genetic information and configured to retain meta-knowledge are described. The actors are adapted with unique behavioral and physical attributes which may independently evolve over time. The attributes may include reproduction based attributes which direct how, when, and with whom the actor reproduces and may be subject to mutation and reproductive forces. The attributes may include evaluation attributes which dictate when and how each actor evaluates their performance. The evaluation attributes may also be subject to mutation and reproductive forces. The attributes may consider meta-knowledge which is a reflection of information gathered by an actor. What and how much meta-knowledge is collected may also be expressed as one or more evolvable attributes.

18 Claims, 8 Drawing Sheets

(56) References Cited

U.S. PATENT DOCUMENTS

| | | |
|---|---|---|
| 6,556,893 B2 | 4/2003 | Kumar et al. |
| 6,563,503 B1 | 5/2003 | Comair et al. |
| 6,636,781 B1 | 10/2003 | Shen et al. |
| 6,640,145 B2 | 10/2003 | Hoffberg et al. |
| 6,694,224 B2 | 2/2004 | Ramanan |
| 6,760,645 B2 | 7/2004 | Kaplan et al. |
| 7,343,222 B2 | 3/2008 | Solomon |
| 7,499,893 B2 | 3/2009 | Czora |
| 7,684,892 B2 | 3/2010 | Yuan et al. |
| 7,751,937 B2 | 7/2010 | Sabe et al. |
| 7,751,938 B2 | 7/2010 | Tsusaka et al. |
| 7,844,556 B2 | 11/2010 | Edelman et al. |
| 7,937,337 B2 | 5/2011 | Lee et al. |
| 2003/0088530 A1 | 5/2003 | Ramanan |
| 2004/0030449 A1 | 2/2004 | Solomon |
| 2004/0054638 A1 | 3/2004 | Agami et al. |
| 2004/0068416 A1 | 4/2004 | Solomon |
| 2004/0133355 A1 | 7/2004 | Schneider |
| 2005/0118996 A1 | 6/2005 | Lee et al. |
| 2005/0240571 A1* | 10/2005 | Haigh ............... A61B 5/11 |
| 2007/0260570 A1* | 11/2007 | Hinchey ............ G08B 17/10 706/47 |
| 2008/0058988 A1 | 3/2008 | Chung et al. |
| 2009/0024249 A1 | 1/2009 | Lee et al. |
| 2009/0104992 A1 | 4/2009 | Kouno |
| 2010/0205122 A1 | 8/2010 | Abramson |
| 2010/0262286 A1 | 10/2010 | Eidenberger et al. |
| 2011/0060425 A1 | 3/2011 | Freed |

OTHER PUBLICATIONS

Andrew G. Barto and Richard S. Sutton, Reinforcement Learning: An Introduction (Adaptive Computation and Machine Learning) (A Bradford Book eds., Mar 1, 1998). This reference is of record in U.S. Appl. No. 13/462,683, filed May 2, 2012, which is the parent of this continuation application.

Michael L. Littman, Value-function Reinforcement Learning in Markov Games. Journal of Cognitive Systems Research. Mar. 2001. This reference is of record in U.S. Appl. No. 13/462,683, filed May 2, 2012, which is the parent of this continuation application.

Reinforcement Learning (http://en.wikipedia.org/w/index.php?oldid=430289446). Mar. 2011. This reference is of record in U.S. Appl. No. 13/462,683, filed May 2, 2012, which is the parent of this continuation application.

Quoc V. Le et al., On Optimization Methods for Deep Learning (Computer Science Department, Stanford University). Jun. 2011. This reference is of record in U.S. Appl. No. 13/462,683, filed May 2, 2012, which is the parent of this continuation application.

* cited by examiner

PSEUDO-GENETIC META-KNOWLEDGE ARTIFICIAL INTELLIGENCE SYSTEMS AND METHODS

CROSS-REFERENCE TO RELATED APPLICATIONS

This application claims priority to and is a continuation of U.S. application Ser. No. 13/462,683, filed on May 2, 2012, entitled PSEUDO-GENETIC META-KNOWLEDGE ARTIFICIAL INTELLIGENCE SYSTEMS AND METHODS, which is hereby incorporated herein by reference in its entirety. Any and all priority claims identified in the Application Data Sheet, or any correction thereto, are hereby incorporated by reference under 37 C.F.R. §1.57.

BACKGROUND

1. Field

The present application relates generally to artificial intelligence systems and methods, and, more specifically, to pseudo-genetic meta-knowledge based artificial intelligence systems and methods.

2. Background

Artificial intelligence systems seek to provide human-like behavior to autonomous actors. An actor may be an entity programmed to interact in an environment. An actor can be anything as simple as a computer opponent in online poker (simulated environment), or a drone executing a complex series of military maneuvers (real environment). To produce actors, some systems include genetic algorithms. Genetic algorithms may include Boolean variables to express hypothetical actors. Each of these Boolean variables may be considered a "gene." When two parents "mate" to form offspring, their children may inherit Boolean "genes" as determined by a global "Genetic Operator" function.

Some systems include genetic programming Genetic programming generally refers to algorithms which use mathematical functions to express a hypothesis. These mathematical functions may be created by ever-elongating chains of operators, static numbers, and variables—each of which is considered a "gene." When parents "mate" to form offspring, their children may inherit "chains" of mathematical operations as determined by a global "Genetic Operator" function.

A genetic operator generally refers to a "mating" operation which mixes the genetic information from genetic algorithm or genetic programming parents into their offspring. This is a static, hard-coded function at the start of the simulation. Specific examples of "mating" operations include: single-point crossover, two-point crossover, uniform crossover, and point mutation.

The genetic algorithms and genetic programs hold physical attributes static while the artificial intelligence is permitted to evolve over time. Accordingly, all actors have the same physical characteristics. Thus, the actors generated through these methods are a reflection of behavior evolution which may be tied to a specific physical form.

Furthermore, the evolution process genetic algorithms and genetic programs evaluate actors based on a fixed learning parameter. For example, reward functions may be chosen at the time of programming, and are assigned a static weight function by the simulation designer. A reward function generally refers to an immediate, quantitatively measurable result obtained by an actor based on its environment. For example, an actor used for blackjack card game simulation could have its reward function consider the dollar amount won in every game. Reward function values in an infinite sample may also attenuate over time, but only as dictated by a single depreciation variable. The simulation designer may select weights for the reward functions and depreciation variables which appear to be desirable, but in practice do not generate the optimal results in a given environment. This can only be discovered through thousands of simulated experiments and results, and can be prohibitively time consuming.

In addition, many reward functions rely on the Markov Property (MP) or Markov Decision Process (MDP), which presumes that historical states or actions do not impact current or future decisions. This may limit their simulation's ability to recognize stagnation in macroscopic behavior patterns which can be exploited by observant humans.

In many systems, the reward function may determine which actors are selected for reproduction, and which are culled from the testing pool. The timing for reproduction is generally universal for all actors, that is, the simulation allocates a time for reproduction. While this can lead to rapid convergence to a set of successful behaviors, it can also lead to rapid homogenization of a population. This mass homogenization may create a universal weakness in the actors when a single exploit is found.

Accordingly, improved artificial intelligence systems and methods are desirable.

SUMMARY

The methods and devices described each have several aspects, no single one of which is solely responsible for its desirable attributes. Without limiting the scope of this disclosure, some features will now be discussed briefly. After considering this discussion, and particularly after reading the section entitled "Detailed Description" one will understand how the features described provide advantages that include artificial intelligence systems and methods including pseudo-genetic meta-knowledge, among other advantages.

In one aspect, an autonomous actor apparatus is provided. The autonomous actor apparatus includes a sensor configured to detect information about the apparatus and an environment in which the apparatus is operating. The apparatus also includes a memory configured to store detected information. The apparatus further includes a physical controller configured to maintain a physical attribute of the apparatus. The physical attribute may be based on a control sequence for the apparatus. The physical attribute may be associated with a physical interaction of the apparatus with the environment. The apparatus also includes a behavior controller configured to maintain a behavior attribute of the apparatus. The behavior attribute may be based on a control sequence for the apparatus. The apparatus also includes a processor. The processor of the apparatus may be configured to determine adjustments to the control sequence, the determination based at least in part on the detected information. The processor may be further configured to provide the adjustments to the physical controller and the behavior controller.

In another aspect, a method of generating a control sequence for an autonomous actor is provided. The method includes receiving one or more control sequences from a plurality of autonomous actors. The method includes identifying portions of control sequences from the one or more control sequences that will contribute to the control sequence for the autonomous actor based at least in part on a portion of the one or more received control sequences. The method also includes generating a control sequence for the autonomous actor based at least in part on the identified control sequences.

In a further aspect, a computer-readable storage medium comprising instructions executable by a processor of an apparatus is provided. The instructions cause the apparatus to receive one or more control sequences from a plurality of autonomous actors. The instructions also cause the apparatus to identify portions of control sequences from the one or more control sequences that will contribute to the control sequence for an autonomous actor based on at least a portion of the one or more received control sequences. The instructions further cause the apparatus to generate a control sequence for the autonomous actor based on at least the identified control sequences.

DETAILED DESCRIPTION

Figure 1:
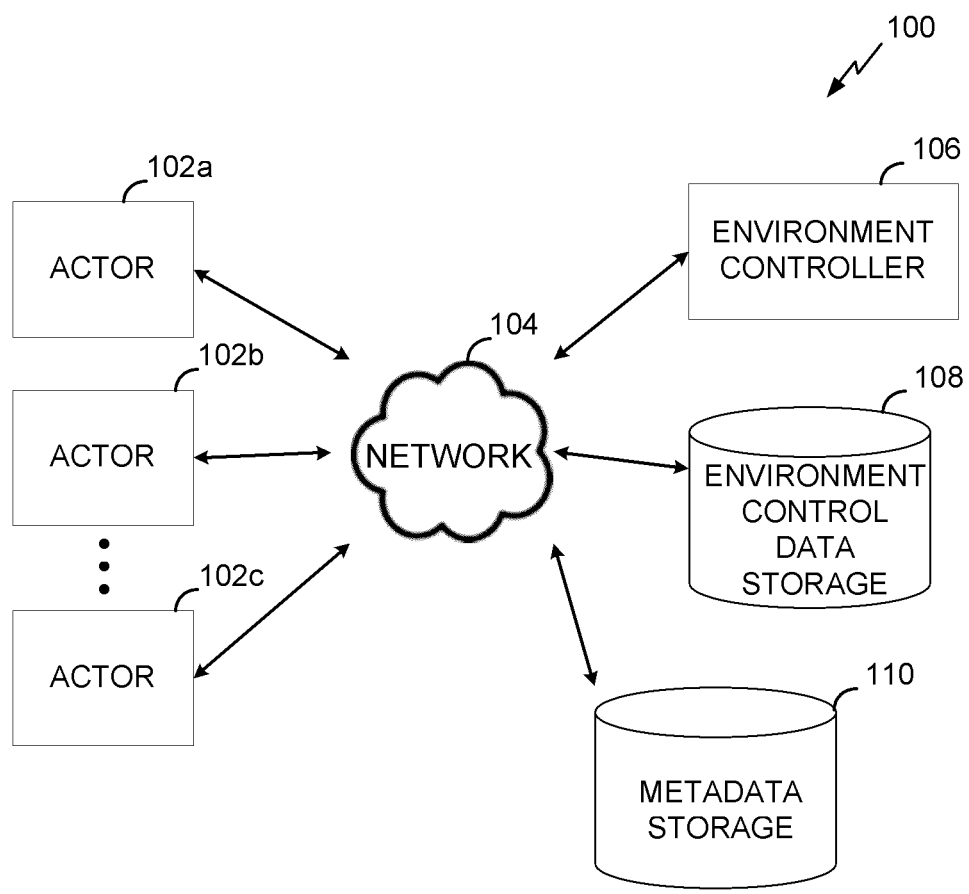
FIG. 1 is a block diagram illustrating an exemplary system including pseudo-genetic actors configured to consume meta-knowledge.

Pseudo-genes and meta-knowledge may be implemented together or independently to overcome several challenges with traditional artificial intelligence/genetic techniques. Systems and methods for artificially intelligent physical and virtual actors including pseudo-genetic information and configured to retain meta-knowledge are described. The actors are adapted with unique behavioral and physical attributes which may independently evolve over time. The attributes may include reproduction based attributes which direct how, when, and with whom the actor reproduces and may be subject to mutation and reproductive forces. The attributes may include evaluation attributes which dictate when and how each actor evaluates their performance. The evaluation attributes may also be subject to mutation and reproductive forces. The attributes may consider meta-knowledge which is a reflection of information gathered by an actor. What and how much meta-knowledge is collected may also be expressed as one or more evolvable attributes.

Various aspects of the novel apparatuses and methods are described more fully hereinafter with reference to the accompanying drawings. The apparatuses and methods described herein may, however, be implemented in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel apparatuses and methods disclosed herein, whether implemented independently of or combined with any other aspect of the disclosure. For example, an apparatus may be implemented or a method may be practiced using any number of the aspects set forth herein. In addition, the scope of the description is intended to cover such an apparatus or method which is practiced using other structure, functionality, or structure and functionality in addition to or other than the various aspects set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to other evolution based systems or methods. The detailed description and drawings are merely illustrative of the disclosure rather than limiting, the scope of the disclosure being defined by the appended claims and equivalents thereof.

DEFINITIONS

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

A control sequence may refer to instructions for operating an actor, which may be provided by one or more entities. For example, a control sequence may include the sequence of commands that may be used to move a robotic actor forward. The control sequence may include preconditions and/or postconditions for a sequence of commands. For example, the movement forward may be predicated on a determination that no obstacle is located in the desired movement direction. As another example, after movement, a robotic actor may be configured to pause operation to, for example, allow a motor to cool down. The control sequence may be stored in static or semi-static memory. The control sequence may be stored as a data structure.

An example of a control sequence is a pseudo-gene. Pseudo-genes may include representations of physical characteristics and behavior characteristics of an actor.

An actor may include an entity, physical or virtual, programmed to interact in an environment. The actor may be a computer opponent in online poker (simulated environment), or a drone executing a complex series of military maneuvers (real environment). Note that humans need not directly participate in the simulated environment, e.g. a flight simulator may simply test an actor's performance under harsh weather conditions. An actor may include a simulated or virtual entity containing parallel components and/or capabilities as described herein.

Physical characteristics may include minimum or maximum speed or size, color, acceleration, or any other property indicating how an actor interacts with a real or simulated environment. Physical characteristics may generally be associated with a physical interaction (e.g., movement) of an actor within its environment.

Behavior characteristics may include the likelihood of the actor changing from one state to another, mating preferences, or the willingness to communicate and/or remember meta-knowledge.

The state of an actor may generally refer to a collection of measurements which an actor can determine from the environment at a given time. A state change may include an actor changing location, posture, or self-assessment criteria. For example, in a video game, actors may be robot players whose characteristics are determined by and/or controlled by pseudo-genes. As the actors play iterations of the game, some will perform better than others due to their genetic composition. Unlike traditional genetic representations of actors in a population—whereby all actors have the same physical characteristics and vary only at a behavior level—pseudo-genetic actors allow individual evolution of actors along physical and behavioral dimensions concurrently. Similarly, unlike traditional representations of actors in a population—whereby the performance rating and reproductive worthiness of all actors are judged by a single, universal rule—pseudo-genetic actors allow individual variations of performance rating and reproductive worthiness.

Meta-knowledge may include an effective expression of greater intelligence based on the distilled information obtained from external sources (e.g., observing other actors, extracting information from pools of recorded data). For example, in a video game, meta-knowledge can be harvested from observing how human players pick a path through a given area, or calculating the statistically safest path by analyzing the success and failure of human or robot players from a data pool.

By managing meta-knowledge, actors may capitalize on the wisdom of human behavior without having to mimic the workings of the human brain. Humans generally arrive at conclusions by creating a model of the entire arena, and then hypothesizing about a huge array of possible enemy positions, their line of sight, possible choke points, positions of allies and other enemies, recent troop movements, and numerous other variables. Humans then select the route with the highest chance of success. In other words, the path chosen by the human player may be an expression of intelligent modeling, based on volumes of experience and the ability to quickly hypothesize in a new environment.

Given this collection of interrelated variables, it would be computationally difficult or impossible for a computer system to calculate every possible enemy position on any given map in real-time, analyze possible choke points, weigh recent friendly and enemy troop movements, etc. and then approximate a safe path to travel from Point A to Point B. Instead, the actor can observe which paths are successfully taken by humans (e.g., those that survive), and then imitate this behavior. This allows for rapid adaptation to new surroundings, and saves thousands of "evolutionary" or "trial and error" cycles on the part of the actor.

Within an artificial intelligence system, the pseudo-genes may be used to control an actor's physical characteristics and/or alteration of the characteristics (e.g., the aspects of the actor which interact with a real or simulated environment). For instance, the pseudo-genes may control the value function of an actor. The value function may evaluate and control various aspects of the actor. For example, the value function may affect the collection, storage, and/or use of meta-knowledge. The value function may affect the activation of various physical attributes or capabilities (e.g., turning sensors on or off; altering power output to a propulsion system). The value function may affect the initiation of new structure or random behavior patterns. The value function may be used to affect "social" interactions with other actors such as sharing pseudo-genes or meta-knowledge information, or self-organizing with other actors into groups, working partnerships, or mating. Meta-knowledge may include recorded information regarding self (e.g., the actor), observed actors, environmental observations, and/or historical data archives including data. The value function and other pseudo-genetic characteristics may be configured to determine the value of the given meta-knowledge (e.g., on the whole), along with the relative value of each component of meta-knowledge.

Overview of Certain Advantages

One advantage of certain systems and methods described herein is that each actor may inherit a unique set of physical and behavioral pseudo-genetic characteristics. The characteristics may then be slightly mutated. This can give rise to much more robust and diverse systems—tandem evolution of behavior and physical attributes can give rise to the necessity of complexity wherever appropriate for the physical model and environment. This is done without contrived input from simulation designers which may incorrectly estimate optimal physical or behavioral characteristics.

Over time, successful lineages of actors may begin to specialize into roughly defined "species." This also allows for complementary co-existence in a given environment. Some systems force physically identical actors to compete for the exact same resource or target. However, in some implementations described below, the species can specialize enough to allow for complementary behavior as well as competitive behavior. For example, one species of drones may specialize in attacking targets in vehicles, while another may specialize in targeting targets on foot or under cover. While there can be overlap between the two, each species would complement the other as they hunted targets. These non-trivial specializations would be the consequence of programmatic evolution, not contrived templates created by programmers at the time of coding.

Another advantage of certain systems and methods described herein is that each actor may have a unique, individual reward function. The reward function parameters may be subject to learning adaptation and controlled by pseudo-genes. Accordingly, the reward function information may be passed to offspring and subject to mutation. Note that this can include a much more sophisticated method for attenuating historical rewards as compared with a single exponential decay variable.

Because each actor may have a unique reward function, it may seek to maximize its rewards in slightly different ways. In turn, these varied reward functions may complement different mutating physical or behavioral pseudo-genes in each individual. This process can be bounded by a multitude of variables defined in each simulated environment. This is a sharp contrast to global reward functions which are applied to all actors in a given experiment, which by definition forces convergence to a narrow set of successful criteria. Diversity in reward functions may give rise to very heterogeneous populations, which may self-adapt in complex ways that would be unforeseeable by a simulation designer. In other words, mutations in the reward function may encourage further mutations which create actors more honed and successful in a given environment than originally conceived by the designer when constructing the simulation. Each surviving actor may present a unique set of solutions (behavioral and physical working in tandem) to the given problem, further refined by natural selection of highly successful individuals.

Note this is also very different than implementations which may allow actors to change the characteristics of their policies, but not alter the reward functions. A policy generally refers to a set of rules or functions based on the environment state used to determine an action to be taken by an actor. In such implementations, Policy ($\pi 1$) may return a greater reward than Policy ($\pi 2$)—however, the designer may have incorrectly approximated the subtle final benefits expressed in the weights of the reward function, so that following Policy (π2) actually generates much more desired results for the given scenario. Similarly, systemic boundaries or attributes may subtly change over the course of a given simulation, especially if humans are also dynamically interacting with the actors. Again, static-set reward functions and policies may continue to indicate that Policy (π1) is more favorable, even though Policy (π2) might generate more desired results.

Again, designer-imposed parameters of the reward function are only arbitrary human guesses at the optimal desired result. The "true" parameters which dictate all possible valid configurations are the boundary conditions of the simulation (e.g. a value indicating overall health greater than 0, where health value of 0 indicates a "dead" actor).

When these artificial incentives dictated by the reward function are held static, then the resultant actors will narrowly fulfill the explicit reward system while remaining within the boundary conditions. This can be a huge weakness if the boundary conditions change or are handled incorrectly (e.g., bad parameters of a simulation which is supposed to mimic real life), or if the conditions within the environment change enough so that the static reward function suddenly generates sub-optimal results. Given these conditions, in some implementations, an actor may attempt to optimize itself according to skewed or incorrect parameters, and may collapse into a sub-optimal state.

Several implementations described below encourage a much more broad exploration of configuration space. Accordingly, there are a much more broad set of resultant actors to choose from. Similarly, if boundary conditions change, there may be actors near the "edge" of the configuration space, which means they can more quickly adapt. Actors may otherwise be too narrowly clustered near the universal, static reward function variables to quickly explore new configurations.

Another advantage of certain systems and methods described herein is that each actor may have individual criteria used for selecting desirable reproduction partners (e.g., mates). This allows for incredible divergence in populations, since the criteria for reproduction may vary from individual to individual. This may give rise to highly heterogeneous actor populations which still meet the basic criteria for "survival" and/or boundary conditions in a given simulated environment, but can withstand incredible shocks or changes to the environment. The chances of a universal exploit arising in such a diverse population are greatly reduced.

Furthermore, this prevents rapid convergence to a single homogeneous collection of actors. While this may somewhat slow the ability of the simulated population to solve a single dilemma, the diversity created from this reproductive schema leads to very robust heterogeneous populations which may not be vulnerable to any one exploit.

In addition, actors in some of the implementations described herein can form "working partnerships" or reproduce with any number of partners. The preference for the number of participating partners can be controlled by pseudo-genes. The multiple-parent system and methods described may allow offspring to immediately benefit from the pseudo-gene and meta-knowledge information from all contributing parents.

Similarly, the pseudo-genetic or meta-knowledge contributions from each parent may not be statically defined. Each parent may contribute a limited amount of pseudo-genetic or meta-knowledge information as determined by various evaluation functions which are unique to each parent. This can prevent useless genes from having an equal chance of being passed on as valuable genes. Parents may each calculate the relative importance of all pseudo-genetic or meta-knowledge material being presented at the time of mating. In other words, each parent's evaluation of the value of their own pseudo-genetic or meta-knowledge and each reproductive partner's pseudo-genetic or meta-knowledge material can change over time. In addition to creating a greater variety in offspring, which prevents convergence to localized extrema, this may create new offspring at each time of mating among a given group of parents, rather than the same offspring every time.

Another advantage of certain systems and methods described is that pseudo-genes may be used to alter the physical characteristics as well as behavior characteristics. For example, there can be a "cost" associated with each Pseudo-Gene, which is used to change physical characteristics or behavior characteristics. This "cost" for improvement or change can prevent a simulation system from collapsing into a trivial solution state. This is critical for the system to find the perfect "trade off" between exploring new space for enhanced performance and exploiting known successful configurations. This also prevents collapse into a trivial solution, e.g. always-perfect aim or infinite health.

For example, a simulation intended to test drones for military manufacture would have specific costs and boundaries on physical attributes, such as movement speed, armor thickness, engine output, battery life, or any other property indicating how an actor interacts with a real or simulated environment. These costs and boundaries could be expressed in real dollar amounts. By introducing a spending limit to the simulated environment (new boundary condition), the drone evolution may be directed to find the most economical trade-off between rewards (such as killing a target) and costs (in real dollars).

Note that this can also be applied to the process of evaluating new configurations—in other words, the system can assign a dollar cost to tweak the configuration of a drone, which should parallel the real-life modification costs of changing manufacturing equipment. This creates a cost structure which limits both the cost of equipment and cost of manufacturing new prototypes.

Furthermore, cost-balanced genetic improvements can implicitly show where the greatest improvements from research and development can be reaped—e.g., demonstrate specific, non-trivial new modifications to drones that can exponentially increase rewards (e.g., kills). For example, a simulation may show that a 10 percent increase in battery life in tandem with a 5 percent increase in sensor range renders a 10,000 percent improvement in drone kills. If limited research and development dollars are redirected towards these identified improvements, it could generate a synergistic net improvement in effectiveness and reduction in cost. In systems which do not necessarily consider an incremental "cost" for improvement, the simulation may collapse to trivial or useless results, e.g. increase battery life or sensor range to infinity.

Example Network Environment

FIG. 1 is a block diagram illustrating an exemplary system including pseudo-genetic actors configured to consume meta-knowledge. The system 100 includes one or more actors such as actor 102a, actor 102B, and actor 102C (individually or collectively herein referred to as actor 102). In an implementation where the system 100 is simulating a process such as manufacturing a widget, each actor 102 may represent a manufacturer. In an implementation where the system 100 is simulating a virtual environment, such as first-person shooter video game, each actor 102 may represent a player in the game. In another implementation the actors 102 may be physical objects such as robotic drones. Details of an actor 102 will be described in further detail below.

Each actor 102 of the system 100 may communicate with a network 104. The communication may be bidirectional. The communication may be accomplished via wired and/or wireless means. The communication may be protocol-based such as via HTTP, 802.11, and the like. Each actor 102 may be configured to communicate via a different communication path with the network. The network 104 may include one or more cellular network, a data network, a local area network, a wide area network, a mesh network, the Internet, public switched telephone network, private network, satellite network, and/or other network.

The system 100 may include an environment controller 106 that communicates with other devices via the network 104. In an implementation where the system 100 is simulating a process such as manufacturing a widget, the environment controller 106 may represent the constraints for the manufacturing process such as resource limits, speed of production, or other global boundary conditions. In an implementation where the system 100 is simulating a virtual environment such as a first-person shooter video game, the environment controller 106 may represent the entity responsible for enforcing global environment issues such as gravity, physics, health attributes, will, and the like. In implementation where the actors are physical machines, the environment controller may represent a central server to provide global information to the actors 102.

The system 100 may include an environment control data storage 108. The environment control data storage 108 may be configured to store information related to the environment. This information may be used via the environment controller 106 to generate and enforce the environment conditions for the system 100. The environment control data store may be coupled with the network 104. Accordingly, other entities of the system 100, such as an actor 102, or the environment controller 106, may access the environment control data storage 108.

The environment control data storage 108 may include any suitable data structure(s), such as one or more relational databases. In some implementations the environment control data storage 108 may be a multidimensional database. In some implementations, the environment control data storage may be static. For example, the environment control data storage 108 for a simulation may be held constant, to allow multiple populations of actors to be generated using the same environmental conditions. Some implementations of the system 100 may provide an interface to receive signals which may be stored in the environment control data storage 108 indicating various environment control data values. The environment control data values may be considered the boundary conditions for the simulation. For example, the environment control data value identifying the boundaries of a space in which actors are permitted to move may be included. Other environment control data values may include physics data (e.g., gravity, light), obstacle information (e.g., structures within the environment), processing resources for the simulation (e.g., in a virtual simulation, the capacity of the device(s) executing the simulation may place constraints on the environment), and the like.

The system 100 may also include a metadata storage 110. The metadata storage 110 may be configured to store metadata about the system 100. For example in a system where the system 100 is simulating a process such as manufacturing a widget, the metadata may include information such as number of widgets produced by each actor, quantity of inputs consumed by each actor, relational information between the actors, evolutionary characteristics such as number of offspring, related to the actors, and the like. In an implementation where the system 100 is simulating a virtual environment such as a first-person shooter video game, the metadata may include information such as health for each actor, number of kills for each actor, number of deaths for each actor, evolutionary characteristics as described above, and the like. In an implementation where the actor 102 is a physical object such as a robotic drone, the metadata may include information such as location, path traveled, evolutionary characteristics such as those described above as well as resource levels such as fuel, ammunition, battery, power, and capabilities (e.g., surveillance capabilities, indication capabilities, data storage).

While the metadata has been described for separate implementations in slightly different terms, depending on the embodiment metadata may include one or more of the above mentioned types of data. Metadata can include aggregated or calculated values based on the above described characteristics. For instance, in a first-person shooter game, the ammunition level may reflect an average ammunition level over a period of time (e.g., actor's life). In a manufacturing simulation, the cost of production may reflect an average cost of production where the system 100 simulates a dynamic pricing model. Other aggregations and calculations are contemplated.

Example Actor

Figure 2:
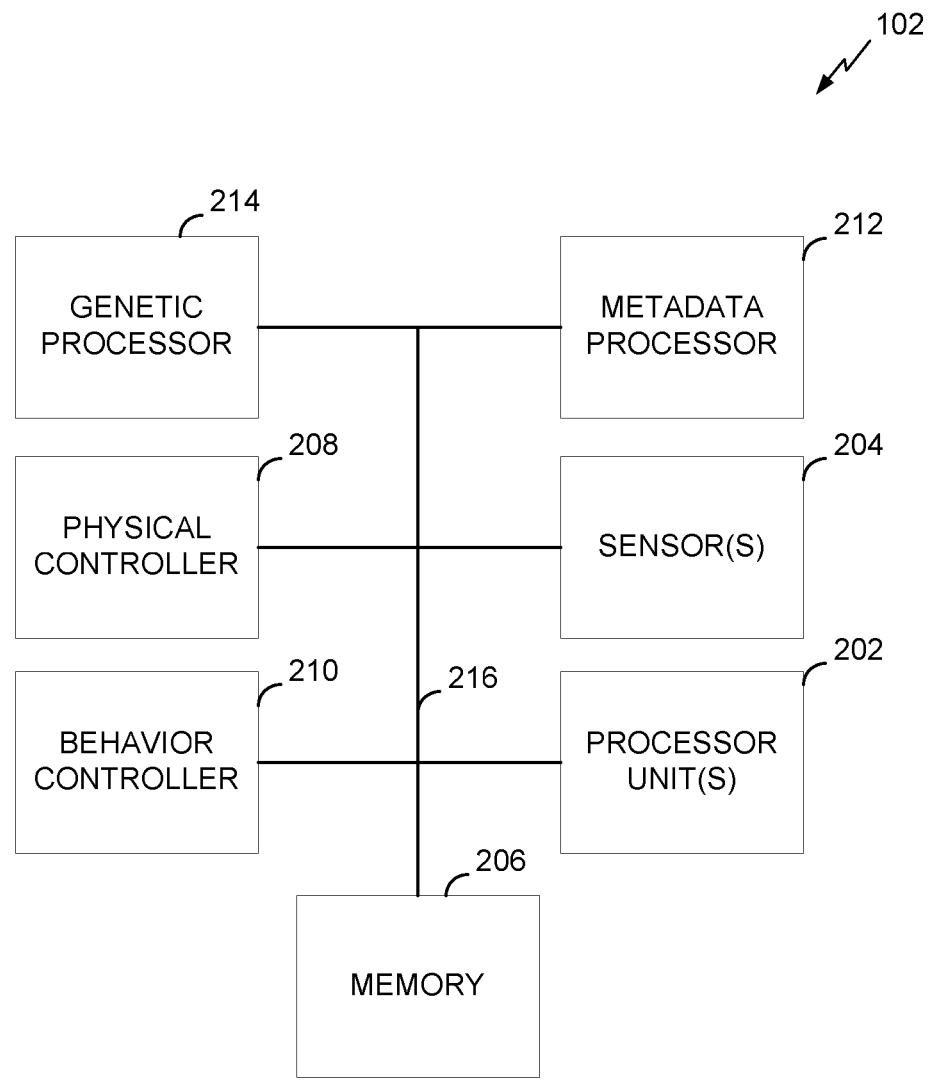
FIG. 2 is a block diagram illustrating an exemplary pseudo-genetic actor.

FIG. 2 is a block diagram illustrating an exemplary pseudo-genetic actor 102. The pseudo-genetic actor 102 may include a processor unit(s) 202. The processor unit(s) 202 may control operation of the actor 102. One or more of the processor unit(s) 202 may be collectively referred to as a central processing unit (CPU). Memory 206, which may include read-only memory (ROM) and/or random access memory (RAM), provides instructions and data to the processor unit(s) 202. A portion of the memory 206 may also include non-volatile random access memory (NVRAM). The processor unit(s) 202 may be configured to perform logical and arithmetic operations based on program instructions stored within the memory 206. The instructions in the memory 206 may be executable to implement the methods described herein. The processor may be configured to transmit signals to one or more of the components of the actor 102. The processor may also be configured to receive signals from one or more of the components of the actor 102.

The processor unit(s) 202 may be implemented with any combination of general or special purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

In some implementations, such as robotic deployments, the actor 102 may also include machine-readable media for storing software. The processor unit(s) 202 may comprise one or more machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processor unit(s) 202, cause the actor 102 to perform various functions described herein.

The actor 102 may include one or more sensors 204. The sensor(s) 204 may be used to receive information about the environment and/or other actors in the system 100. In an implementation where the actor 102 is a physical machine, such as a drone, the sensor(s) 204 may include cameras, clocks, antenna, accelerometers, gravimeters, radiometers, barometers, thermometers, microphones, infrared detectors, chemical sensors, gyroscopes, photodetectors, SONAR, RADAR, and the like. In implementations where the actor 102 is a virtual actor, such as a first-person shooter game, the sensor(s) 204 may include the "eyes" of the actor 102 that collect information that the virtual actor "sees." In implementation where the system 100 is simulating a manufacturing process, the sensor(s) 204 may include throughput sensors, input sensors, quality control sensors, and the like. Each of the sensor(s) 204 may operate independently or be configured to communicate with other sensor(s) 204.

The sensor(s) 204 may be coupled with the processor unit(s) 202 to provide data which can be used to affect control of the actor 102. In some implementations, the sensor(s) 204 may store the sensed information in a memory 206. Accordingly, the information may be provided to the processor unit(s) 202 via the memory 206. In some implementations, the sensor(s) 204 may provide information directly to the processor unit(s) 202. The memory 206 may be a static memory, a dynamic memory, or a removable memory. The memory may include a storage interface which allows the received information to be organized into a structured format such as a relational database.

The actor 102 may include a physical controller 208. The physical controller 208 may be configured to express physically related pseudo-genes. For example, in implementation where a physical robot is the actor 102, such as a drone, the physical controller 208 may include components to adjust the size of the robot. For instance an actuator may expand the diameter of a robot thereby increasing the size of the actor. In virtual simulations, the physical controller 208 may be configured to adapt the physical characteristics of the virtual actor. For instance, the physical controller 208 may be configured to adjust the height and weight of an actor 102 in a first-person shooter game. In a manufacturing simulation system, the physical controller 208 may be configured to adjust physical characteristics of each manufacturing actor 102 such as size of plant, height of plant, physical plant attributes of manufacturing actor (e.g., sewage, electrical wiring, data networking, ventilation).

The physical controller 208 may be configured to communicate with the environment controller 106 (FIG. 1). For example, the physical controller 208 may need to identify whether a particular physical action is permitted by the environment. For example, if the actor 102 is located against a wall, the physical action of "move forward" may not be possible. By consulting with the environment controller 106, the actor 102 via the physical controller 208 may obtain the necessary inputs to manifest a given physical characteristic for the actor 102. Unlike other genetic systems, the only boundary on a physical controller 208 action may be the global boundary conditions for the environment. The system may not include hardcoded constraints on each actor 102 which may implicitly limit the capabilities of a given actor and thus limit the search space available for genetic evolution.

The actor 102 may include a behavioral controller 210. The behavioral controller 210 may be configured to express behavior related pseudo-genes. For example, an implementation where a physical robot such as a drone is contemplated, the behavioral controller 210 may include components to adjust the flight pattern of the drone. For instance, a flight planning computer may alter a flight schedule for the drone thereby altering the behavior of the drone. In virtual simulations, the behavioral controller 210 may be configured to adapt the behavior characteristics of the virtual actor. For instance, the behavioral controller 210 may be configured to adjust the hunting pattern of a first-person shooter actor 102 such as run around and seek targets or find sniping location and wait. Other behavioral characteristics include response to damage taken, response to damage delivered, response to new capabilities, response to new information, quantity of information to retain, quantity of information to share, reproductive preferences, and the like. In an implementation where the system 100 is simulating a manufacturing process, the behavioral controller 210 may be configured to control attributes such as purchasing decisions, pricing decisions, output level decisions, number of workers, quantity and type of equipment, and the like.

The actor 102 may include a metadata processor 212. The metadata processor may be configured to obtain, analyze, and/or create metadata associated with the actor. The metadata processor 212 may be configured to retrieve the metadata via the network 104 from the metadata storage 110. The metadata processor 212 may be configured to calculate new metadata values for an actor based on the metadata stored in the metadata storage 110. Information generated by the metadata processor 212 may be stored in the memory 206 of the actor 102. In some implementations, the metadata processor 212 may store the information generated in the system 100 metadata storage 110.

The quantity of metadata stored and how the metadata is stored may be controlled by the physical controller 208 and/or the behavior controller 210 respectively. For example, the physical controller 208 may be configured to allow the actor 102 to have a memory of a specific size. The amount of metadata an actor may "remember" may thus be limited. The metadata processor 212 may evolve to store certain metadata elements or synthesize metadata from other metadata elements. Similarly, the behavior controller 210 may identify a particular method of synthesizing metadata. The metadata processor 212 may in turn execute this behavior thereby generating a new synthetic item of metadata. The metadata processor 212 may store the information generated in the memory 206 of the actor 102.

The metadata processor 212 may also be configured to manage metadata communication between the actor 102 and other actors. For example, the actor 102 may be configured, such as via a behavior control attribute, such that the actor 102 should never communicate with other actors. In this situation, the actor 102 may configure the metadata processor 212 to refuse to transmit metadata to other actors when requested. Alternatively, the actor 102 may be configured to transmit metadata with anyone who attempts to communicate with the actor 102. In this case, the actor 102 may be configured to transmit data to all corners.

The actor 102 may also include a genetic processor 214. The genetic processor 214 may be configured to manage and control pseudo-genes for a given actor. The genetic processor 214 can be thought of as the DNA for the actor 102. The genetic processor 214 may provide the pseudo-genetic representation of the actor 102 to the physical controller 208 and behavioral controller 210 for expression in the actor 102. The genetic processor 214 may store the pseudo-genes in the memory 206.

The above described components of the actor 102 may be coupled by a bus 216. The bus 216 may be a data bus, communication bus, or other bus mechanism to enable the various components of the actor 102 to change information. It will further be appreciated that while different elements have been shown, multiple processes may be combined into a single element, such as a physical/behavioral controller, or combination of processors into a single processor.

Example Environment Controller

Figure 3:
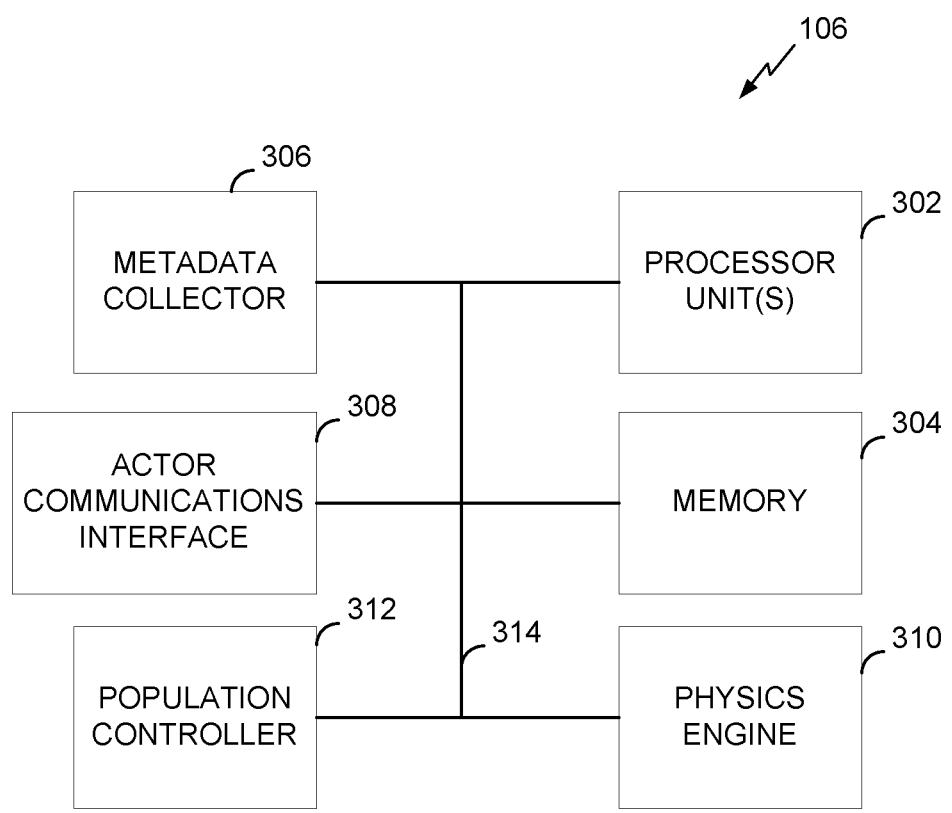
FIG. 3 is a block diagram illustrating an exemplary environment controller.

FIG. 3 is a block diagram illustrating an exemplary environment controller. The environment controller 106 includes a processor unit(s) 302. The processor unit(s) 302 may control operation of the environment controller 106. One or more of the processor unit(s) 302 may be collectively referred to as a central processing unit (CPU). As shown in FIG. 3, the environment controller 106 includes a memory 304. Memory 304, which may include read-only memory (ROM) and/or random access memory (RAM), provides instructions and data to the processor unit(s) 302. A portion of the memory 304 may also include non-volatile random access memory (NVRAM).

The environment controller 106 may include a metadata collector 306. The metadata collector 306 may be configured to collect metadata about the environment and/or the system 100. The metadata collector 306 may be configured to store the information collected in the metadata storage 110. In an implementation where the system 100 is simulating a first-person shooter, the metadata collector 306 may collect information such as the location of actors, a status of actors (e.g., health, ammunition, stamina, skill, kills, deaths), and the like. In an implementation where the actor 102 is a physical machine, the metadata collector 306 may collect information about the location of each actor, the physical actions of each actor, attributes of the environment for the actor (e.g., weather, terrain, time), and the like. In some implementations the metadata collector 306 may be coupled with one or more sensors (not shown), the sensors configured to collect metadata about the environment.

The environment controller 106 may also include an actor communications interface 308. The actor communication interface 308 may be configured to facilitate communication between individual and/or groups of pseudo-genetic actors 102. For example, if an actor 102 wishes to transmit metadata to another actor in the system, the actor 102 may transmit the message to the actor communications interface 308 which in turn may be configured to transmit the message to the recipient actor. In some implementations, the environment may communicate information to the actors as a group. In this case, the environment controller 106 may transmit a message to the actor communications interface 308 for distribution to one or more actors. In an implementation where the actors are physical robots, the actor communications interface 308 may be a radio access technology, or other network communication technology.

The environment controller 106 may also include a physics engine 310. The physics engine 310 may be used in systems where the environment determines and/or maintains physical parameters of the environment such as gravity, light, temperature, etc. The physics engine 310 is generally configured to maintain boundary conditions for the environment. As a result, the system 100 may be configured to allow each actor 102 to individually evolve with as many degrees of freedom as possible within an environment. As such, the physics engine 310 establishes the boundaries within which the actors may evolve.

The components of the environment controller 106 may be coupled by a bus 314. The bus 314 may be a data bus, communication bus, or other bus mechanism to enable the various components of the actor 102 to change information. It will further be appreciated that while different elements have been shown, multiple processes may be combined into a single element, such as a physical/behavioral controller, or combination of processors into a single processor.

Example Pseudo-Gene

Figure 4:
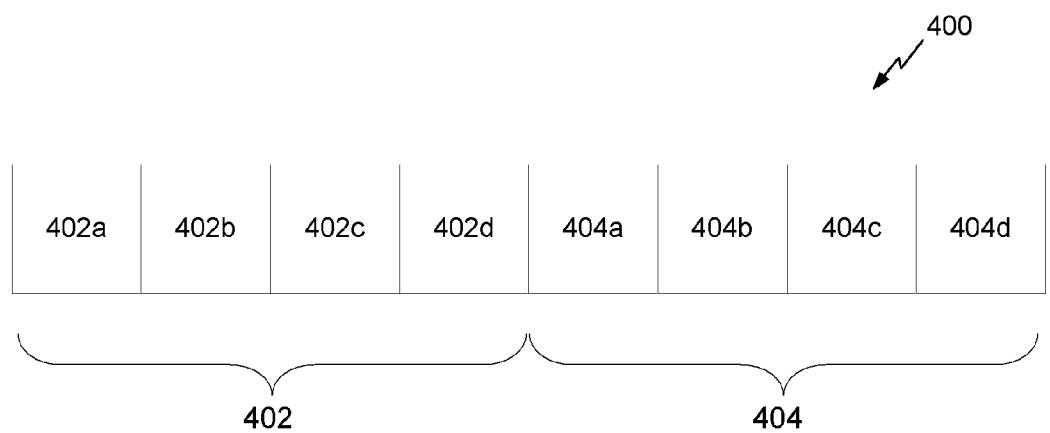
FIG. 4 is a block diagram illustrating an exemplary representation of a pseudo-gene.

FIG. 4 is a block diagram illustrating an exemplary representation of a pseudo-gene. The pseudo-gene 400 may be used to represent the genetic information for an actor. Pseudo-genes are similar to biological genes as they are traits inherited from "parents" into new generations of actors and are subject to random mutation. Pseudo-genes may control the physical characteristics (e.g., maximum speed of movement) and behavioral characteristics (e.g., percent chance to change from State A to State B) of each actor. In a simulated environment, this may alter the simulated physical characteristics of the actor; in a real environment, these mutations may be expressed as tweaks to design (e.g., changing the ammunition load, fuel level, battery charge level, etc. of a drone's physical body). Pseudo-genes may also control the reward which an actor awards itself for a given environmental state.

As shown in FIG. 4, the sample pseudo-gene 400 includes two portions. A first portion 402 may be used to represent one or more behavioral attributes for the actor. The first portion 402 shown includes four behavioral attributes 402a, 402b, 402c, and 402d. The behavioral attributes may include information related to behavioral aspects of the actor. For example, values indicating how the actor should reproduce may be included in the first portion. Other behavioral attributes which may be indicated in the first portion 402 include the percent chance of moving from one environmental state to another or reproductive behavior (e.g., when, with whom, and how), for example.

By way of further examples, in an implementation where the system is simulating a process such as manufacturing a widget, behavior attributes may include hire/fire workers, build/sell equipment, change supplier, change hours of operation, and the like. In an implementation where the system is simulating a virtual environment such as a first-person shooter video game, behavior attributes may include one or more actions to take in response to an event or environment change (e.g., taking fire, direct hit, observe enemy, observe friendly), patterns of movement (e.g., path, speed, crouch, crawl, jump) and the like. In implementation where the actors are physical machines, the behavior attributes may include one or more actions to take in response to a sensed event or environment change (e.g., detect weather change, observe object, impeded forward motion), patterns of movement (e.g., path, speed), and the like.

The example pseudo-gene 400 also includes a second portion 404. The second portion 404 may be used to represent one or more physical attributes for the actor. The second portion 404 shown includes four physical attributes 404a, 404b, 404c, and 404d, which may indicate information related to physical aspects of the actor. For example, values indicating the height, width, weight, and/or total surface area for an actor may be included in the second portion 404.

By way of example, in an implementation where the system is simulating a process such as manufacturing a widget, physical attributes may include physical plant characteristics (e.g., utilities, property). In an implementation where the system is simulating a virtual environment such as a first-person shooter video game, physical attributes may include height, weight, muscle, endurance, color, equipment, and the like. In implementation where the actors are physical machines, the physical attributes may include dimensional data, equipment, color, and the like.

An example of a basic actor representable through pseudo-genes is an actor including one pseudo-gene. It should be noted that such an actor may not survive long in the target environment but may provide a point of genetic diversity for future generations.

Evolution of Actors

Having described the system, the actors, and the pseudo-genetic information which drives the actors, the above described components can be used to evolve actors over time. Evolution generally refers to the process whereby one or more actors contribute some genetic information to yield one or more offspring (e.g., new actors). In some implementations, the contribution patterns for a given actor are predefined as a function of an actor's fitness, a random genetic "cross-over" point, some random mutation rate, and/or other factors. However, in such implementations, the algorithm by which the reproduction occurs is static. Furthermore, the algorithm is applied to each actor in the same way. Accordingly, the population may evolve toward a local optimum point, while failing to provide the genetic diversity to reach a globally optimal point.

Figure 5:
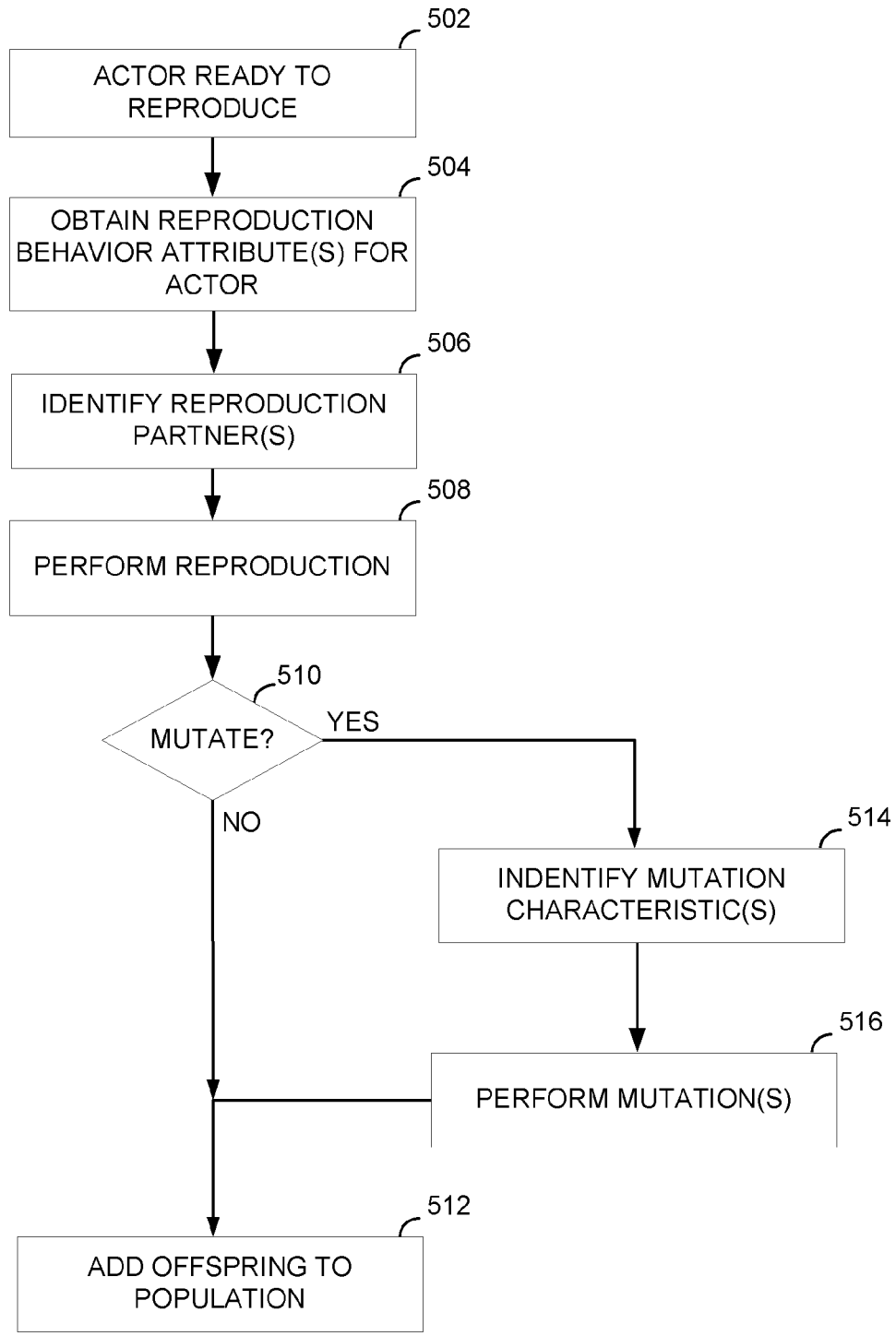
FIG. 5 is a flowchart illustrating an exemplary method of reproduction for a pseudo genetic actor.

FIG. 5 shows an exemplary method of reproduction for a pseudo genetic actor. The method shown in FIG. 5 may be performed by an actor, such as the one shown in FIG. 2. In some implementations, the behavior controller 210 may implement all or part of the method.

At block 502, an actor is identified as ready to reproduce. The conditions triggering the readiness to reproduce may be represented in one or more behavioral attributes of a pseudo gene. In some actors, the behavioral attribute for reproduction may include metadata. For example, the actor may be ready to reproduce when an environment metadata element (e.g., time), reaches a certain value (e.g., one day since last reproduction). The actor may be ready to reproduce when an actor metadata element reaches a certain value such as actor health, actor location, actor achievement. A given actor may trigger reproduction based on its own attributes or key off the attributes of another actor. The actor may be ready to reproduce when population metadata reaches certain values such as population statistics (e.g., average health, average lifespan). It should be emphasized that the consideration of metadata as well as the metadata elements considered may be evolved attributes represented in the pseudo gene for an actor. Accordingly, this aspect of reproduction is not mandated by an algorithm, a priori, for all actors. Instead, the triggering condition for reproduction may itself be the product of reproduction.

At block 504, additional reproduction behavioral attributes are obtained for the actor. In some implementations, it may be efficient to maintain only the behavioral attributes related to the triggering of reproduction in active memory. Once triggered, the additional attribute(s) may be loaded at block 504. The additional attributes define other parameters that influence how and with whom the actor will attempt reproduction.

At block 506, reproduction partner(s) are identified based on a selection attribute that may be part of the reproduction behavioral attributes obtained in block 504. The selection attribute defines the criteria an actor will use to identify suitable partner(s). For example, the selection attribute may indicate reproduction with the first actor encountered. In other implementations, the actor may define self reproduction whereby the actor will mate with itself. In some implementations, the selection attribute may indicate multiple reproductive partners. As with the triggering of reproduction, the selection attribute may be driven by metadata. Furthermore, as above, which metadata elements and how the metadata elements are combined to generate a selection attribute are themselves evolvable. Accordingly, the selection criteria may be unique for each actor and may evolve over time.

At block 508, reproduction is performed. The process by which reproduction is performed may also be unique for each actor. The process may evolve over time as a product of reproduction with various actors. The reproduction, in its simplest form, may take certain pseudo genes from the actor and its partner(s) to generate a new actor.

It should be noted that in the pseudo genetic system described herein, unlike in the biological world and traditional genetic programs, the gene length may vary over time. Each actor in the system may include a unique number of genes as genetic information is contributed through reproduction. For example, consider the case where an actor selects one partner for reproduction. The actor has 10 pseudo genes and the partner has 12 pseudo genes. The actor may have evolved a method of reproduction whereby each partner contributes half their genes. In such a case, the offspring will have 11 genes (5 from the actor and 6 from the partner). In some implementations, a synthesizer may refer to the one or more attributes indicating how the reproduction will be performed. That is, how the pseudo-genetic material selected from the partners will be combined to generate the offspring.

At decision block 510, a determination is made as to whether any mutations will occur for this reproduction. The determination may be based at least in part on one or more pseudo-genes for the actor and/or partner. The determination may also be based in part on information from the environmental controller. For example, in a virtual simulation, the environmental controller may include a radiation level which may be included in the determination of mutation for the actor and/or partner. The mutation determination may be performed for the actor or the pending offspring actors. Although shown as following block 508, in some implementations, the determination regarding mutation may be performed prior to block 508.

If the determination is made to not mutate, the process continues to block 512 where the offspring are added to the population. If the determination is made to mutate, at block 514, mutation characteristic(s) are identified. The identification of mutation characteristic(s) may be based at least in part on pseudo-genes for the actor. For example, the form of mutation, the quantity of mutation, the location of mutation, and the like, may be coded as pseudo-genetic attributes. The pseudo-genetic attributes may also consider metadata when determining the mutation characteristic(s).

At block 516, the mutation is performed based at least in part on the identified mutation characteristic(s). For example, the mutation may consider a cost for mutating a particular attribute. In an implementation where the system is simulating a process such as manufacturing a widget, each pseudo-gene may have a mutation cost associated with it. The quantity and amount of mutation may be limited to a total cost for the actor. As should be apparent from the description above, this total cost may also be represented in the pseudo-gene for the actor. In some implementations, the mutation may be a defined as a random occurrence based on, for example, time. In some implementations, the mutation determination may be performed once for the entire pseudo-gene. In some implementations, the determination at block 512 and subsequent actions at blocks 514 and 516 may be performed one or more time for each attribute represented in the pseudo-gene.

At block 512, the offspring resulting from the reproduction are added to the population. The offspring are then considered actors within the system and may subsequently reproduce using a similar process as shown in FIG. 5.

Self-Assessment

In some genetic based systems, the assessment of each actor is periodically achieved using a fitness test. The fitness test may be a generalized assessment of actors to determine how well or poorly each actor performed. This may provide a relative grading of actors wherein the best actors have a higher fitness score than the worst actors. In some systems, this fitness information is used to determine which actors survive and which are unfit to survive. In some implementations, the fitness function is static and does not change overtime. Furthermore, as with the reproduction mechanism discussed above, in some systems the fitness function is a global assessment where all actors are judged similarly. Accordingly, the population may evolve toward a local optimum point, while failing to provide the genetic diversity to reach a globally optimal point.

Figure 6:
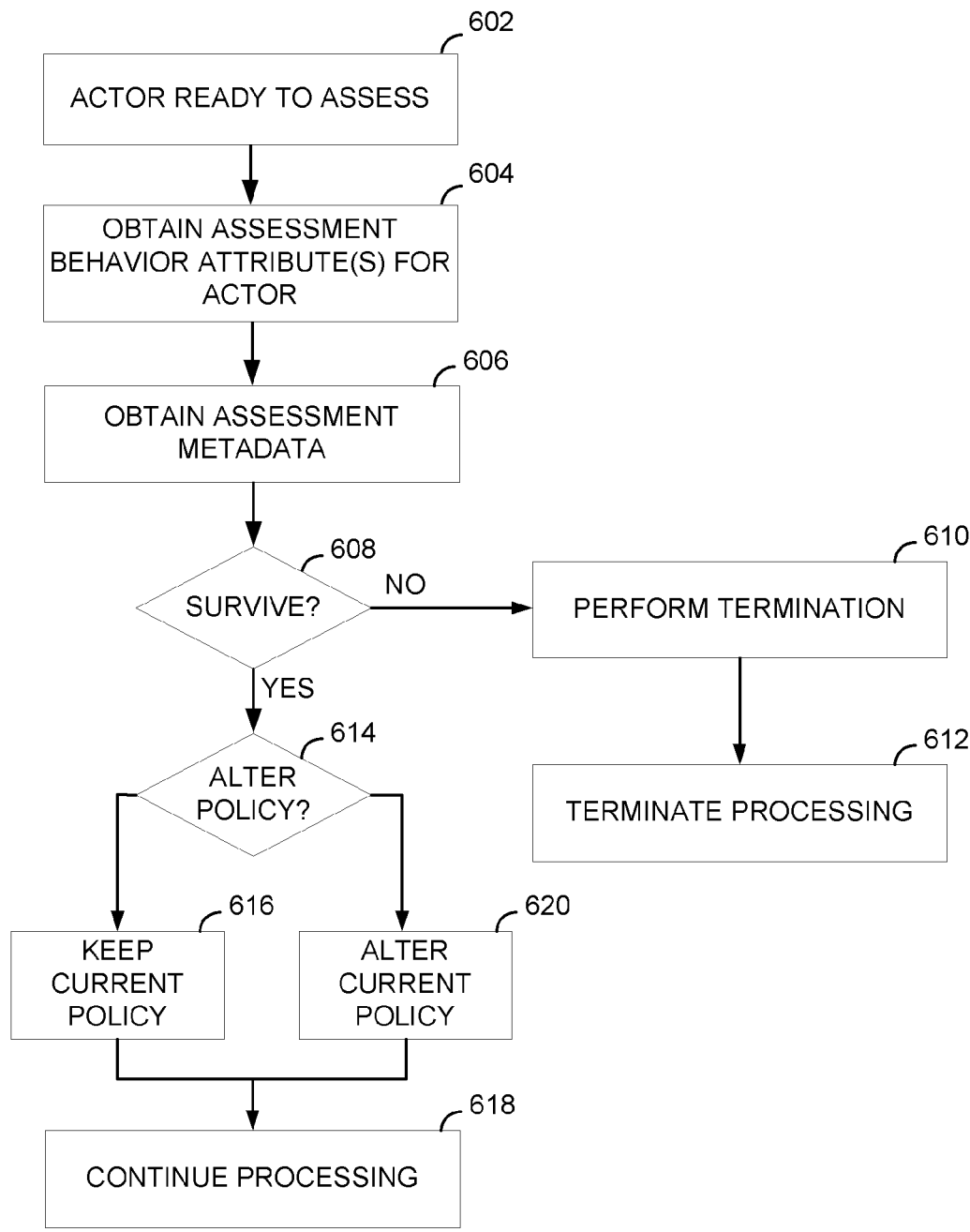
FIG. 6 is a flowchart illustrating an exemplary method of self-assessment.

FIG. 6 is a flowchart illustrating an example method of self-assessment which allows actors to have unique self-assessments. The self-assessment is governed by pseudo-genes and as such may mutate and evolve over time. The method shown in FIG. 6 may be implemented within an actor such as that shown in FIG. 2.

At block 602, the actor determines whether it is ready to perform a self-assessment. The conditions triggering the readiness to self-assess may be represented in one or more behavioral attributes of a pseudo-gene. In some actors, the behavioral attribute for self-assessment may include metadata. For example, the actor may be ready to self-assess when an environment metadata (e.g., time) element reaches a certain value (e.g., 1 day since last self-assessment). The actor may be ready to self-assess when an actor metadata element reaches a certain value such as actor health, actor location, or actor achievement, for example. A given actor may trigger self-assessment based on its own attributes or key off the attributes of another actor. The actor may be ready to self-assess when population metadata reaches certain values such as population statistics (e.g., average health, average lifespan). It should be emphasized that the consideration of metadata as well as the metadata elements considered may be evolved attributes represented in the pseudo-gene for an actor. Accordingly, this aspect of self-assessment is not mandated by an algorithm, a priori, for all actors. Instead, the triggering condition for self-assessment may itself be the product of reproduction.

At block 604, the self-assessment behavioral attribute(s) are obtained. The self-assessment behavioral attribute(s) may include the basis for the assessment (e.g., metadata to be included, which actors to include in the assessment). The self-assessment behavioral attribute(s) may include a scope of the assessment (e.g., time, number of actors). The self-assessment behavioral attribute(s) may include weights for the assessment. For example, in a first person shooter system, an actor may evolve a self-assessment attribute whereby the number of kills by an actor is weighted more heavily in a self-assessment than the damage incurred by the actor. In a manufacturing simulation, the self-assessment for a given actor may weigh the quantity of pollutants dispensed more heavily than the profits generated.

At block 606, the metadata identified as the basis for the self-assessment are obtained. In some implementations, this may include retrieving metadata from the memory of the actor. In some implementations, this may include retrieving metadata from the environment controller. In some implementations, this may also include retrieving metadata from other actors.

At block 608, a determination is made as to whether the actor will survive. The actor may determine based on its evolved self-assessment parameters that it is no longer fit to survive. At block 610, the actor initiates termination procedures. As part of the termination procedures, the actor may be configured to transmit a signal to the environment controller (e.g., population controller) indicating that the actor is removing itself from the population. In this case, the actor may destroy or otherwise remove itself from the environment. In a simulated environment, this may include freeing the memory locations representing the actor. In a real environment, this may include transmitting a signal to cause the destruction of the physical actor. For example, a robot may include an explosive charge which, when signaled, will render the robot inoperable. If the assessment determines the robot has sustained too much damage to be useful or has strayed beyond its operational boundaries, the self-assessment may render the determination that the robot should be destroyed. Accordingly, a signal may be transmitted to the charge to detonate the explosive charge. At block 612, the actor terminates further processing.

Returning to decision block 608, if the assessment determines the actor survives, at block 614, a determination is made as to whether to alter the actor's current policy. As with self-assessment, the determination as to whether to alter the current policy may be controlled by pseudo-genes. For example, the determination may be based on meta-knowledge such as historical information about the actor. In a first-person-shooter example, the determination may include kill trends such that as the number of kills for a given period of time is trending up, the policy may not change, but if the kills are trending down, the policy may change. Each actor is associated with a policy that dictates how the pseudo-genetic information is organized and processed. A policy may be the probability for an actor to take a certain action in a given state. As with reproduction or survival, the policy may be represented in the pseudo-gene for the actor and evolve over time.

At block 612, as a result of the self-assessment, the policy may be altered. If the assessment indicates the current policy does not need altering, the current policy is maintained at block 616. The actor continues processing at block 618. Returning to decision block 614, if the assessment indicates the policy should be altered, the current policy is altered at block 620. Altering the current policy may include changing the probabilities represented in the pseudo-gene for the actor which indicate the likelihood an actor will take a certain action in a given state. In some implementations, altering the policy may include mutating the pseudo-gene for the actor as described above. The altered current policy is then used to continue processing for this actor at block 618.

Figure 7:
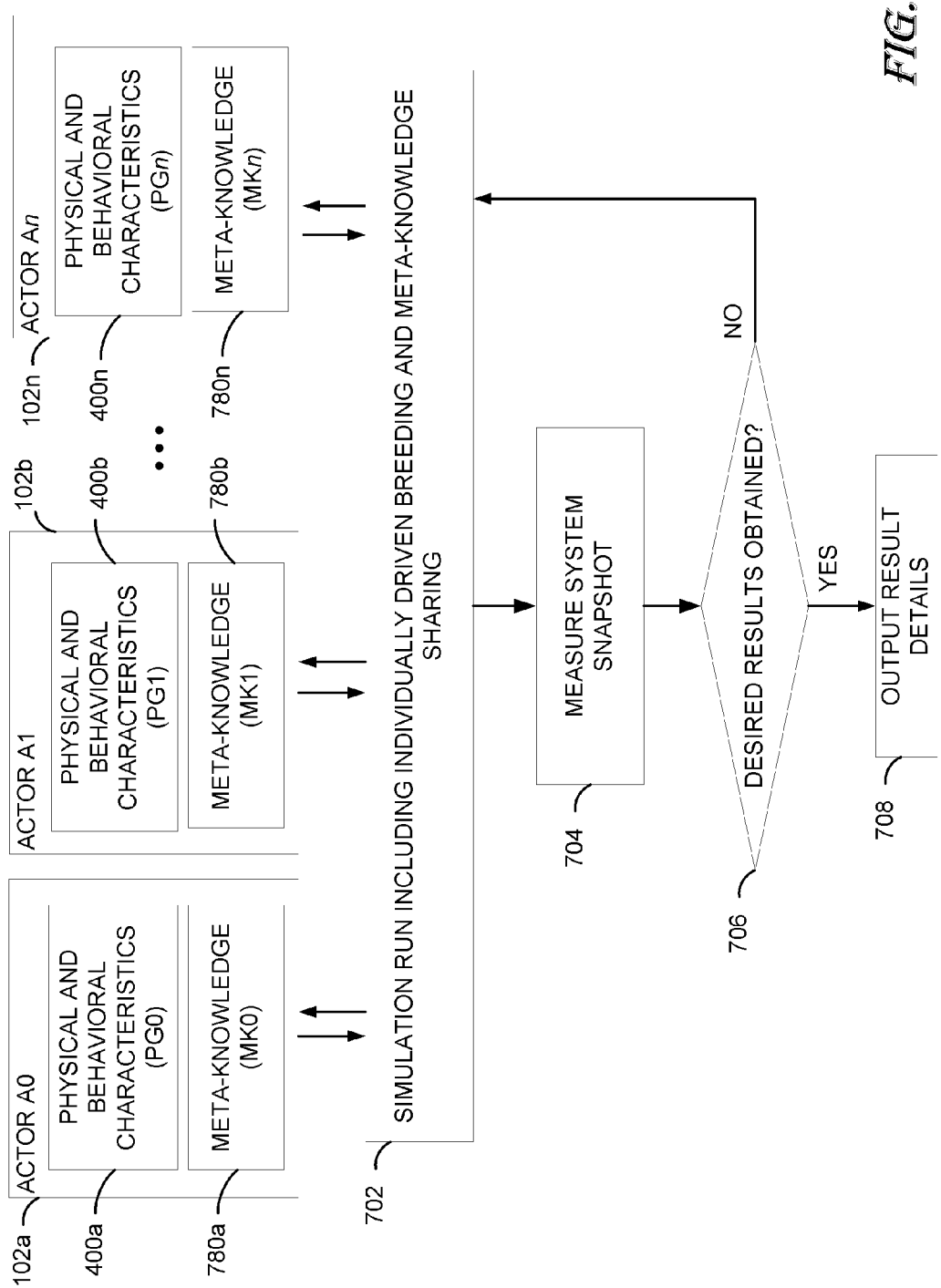
FIG. 7 is a flowchart illustrating an exemplary method of self-adaptation which may be included in a pseudo-genetic system.

FIG. 7 is a flowchart illustrating an exemplary method of self-adaptation which may be included in a pseudo-genetic system. Several advantages may be provided by the method of self-adaptation shown in FIG. 7. For example, the method may provide the ability to test a wide range of physical and behavioral characteristics embodied in different actors, concurrently. This can create a much more diverse, robust system. Furthermore, changes to the environment may favor one variant over the other, but there is no single physical profile which can be universally compromised from a single flaw or weakness. In accordance with the process shown in FIG. 7 and described in detail above, each actor can inherit a unique set of physical and behavioral pseudo genetic characteristics, which may be mutated over time. This may give rise to much more robust and diverse systems—tandem evolution of behavior and physical attributes can give rise to the necessity of complexity wherever appropriate for the physical model and environment. This may be done without contrived input from programmers which may incorrectly estimate optimal physical or behavioral characteristics.

Over time, successful lineages of actors may begin to specialize into roughly defined "Species." This may also allow for complementary co-existence in a given environment. In some implementations, physically identical actors compete for the exact same resource or target. However, by providing pseudo-genetic species, the actors can specialize enough to allow for complementary behavior as well as competitive behavior. For example, one species of drones may specialize in attacking targets in vehicles, while the other may specialize in targeting targets on foot or under cover. While there can be overlap between the two, each species would complement the other as they hunted targets. These non-trivial specializations would be the consequence of programmatic evolution, not contrived templates created by programmers at the time of coding.

The process takes as inputs, one or more pseudo-genetic actors. The process shown in FIG. 7 includes three pseudo-genetic actors 102a, 102b, and 102n. It will be appreciated that n may represent any number of actors that are supported by the system. Each pseudo-genetic actor includes a pseudo-gene 400 and meta-knowledge 780. The pseudo-gene 400 may be implemented as described above in FIG. 4. The meta-knowledge 780 includes the information retained by the actor 102. The information may be information about the actor, about other actors, and/or about the environment. The information may include one or more of currently sensed information, historical information, and predicted information. The meta-knowledge retained by a given actor is dependent on one or more attributes included in the pseudo-gene for the actor. For example, one actor may be configured to only remember what happened to the actor on the previous simulation run. In a first person shooter simulation, this may be performance statistics (e.g., accuracy, hits, health, distance traveled) for the previous match. The amount of retained meta-knowledge that is shared with other actors may also be dependent on one or more attributed included in the pseudo-gene for the actor. For example, in a manufacturing simulation, a manufacturing actor may evolve to share its cost of inputs parameter with other actors while preventing access to profit data.

At block 702, a simulation run is initiated. The simulation run may include individually driven breeding and meta-knowledge sharing as described above. The simulation may include providing information to the actors 102 individually or collectively.

At block 704, a system snapshot is measured. The system snapshot may include an overall assessment of the simulation. The system snapshot may also include individual actor information.

Using the snapshot information measured at block 704, a determination is made at decision block 706 as to whether the desired results are obtained. For example, the system snapshot desired result may be based on a comparison of actors. In a manufacturing simulation, the comparison may be cost, profit, and output for each actor. The decision block 706 may assess the population performance as a whole. For example, in a manufacturing simulation, the snapshot may seek to identify a configuration of actors that produces a certain level of total output for a given level of inputs.

It should be noted that while the system snapshot is a holistic assessment of the population, the overall evolution of the system is not dependent upon the result of the snapshot. Each actor is independent to evolve during the simulation run. Furthermore, it should be noted that the snapshot indicates a moment in time. While the snapshot is assessed, the simulation may continue running and actors may continue evolving.

If the desired results are obtained, the result details may be output at block 708. The output may include transmitting one or more signals indicating the desired result has been achieved, the details of the population and individual actors leading to the result, and/or other information regarding the simulation such as number of iterations executed, time for processing, and statistical information regarding the population (e.g., over time). The output may cause a visual display to render the details.

Returning to decision block 706, if the desired result has not been obtained, the flow may return to execute another simulation run at block 702 as describe above.

Control Sequences

Figure 8:
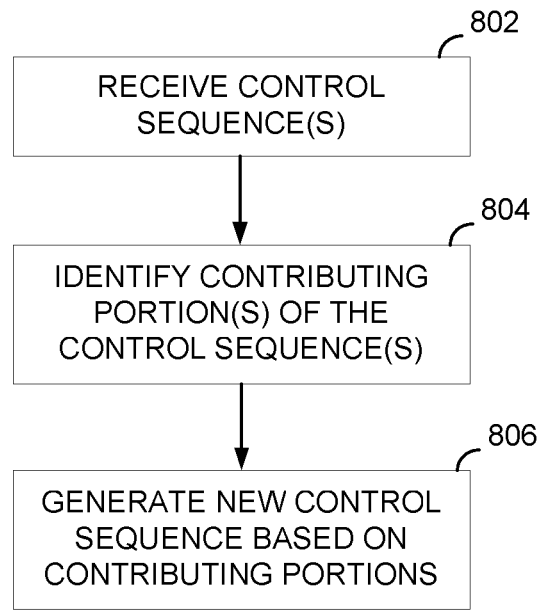
FIG. 8 is a flowchart illustrating an exemplary method of generating a control sequence for pseudo genetic actors.

FIG. 8 is a flowchart illustrating an exemplary method of generating a control sequence for pseudo genetic actors. The method of FIG. 8 may be implemented in one or more of the devices described herein, such as that shown in FIG. 2.

At block 802, one or more control sequences from a plurality of autonomous actors are received. The control sequences may be pseudo-genes as described, for example, in FIG. 4. At block 804, control sequences from the one or more control sequences that will contribute to the control sequence for the autonomous actor are identified. The identification is based on a portion of the one or more received control sequences. For example, as described above, the reproduction behavior attributes of a pseudo-gene for an actor may used to identify the control sequence for generating new actors. At block 806, a control sequence for the autonomous actor based at least in part on the identified control sequences is generated. This may include identification of what portion of the pseudo-genes are contributed from each actor as well as any mutation that may occur.

Figure 9:
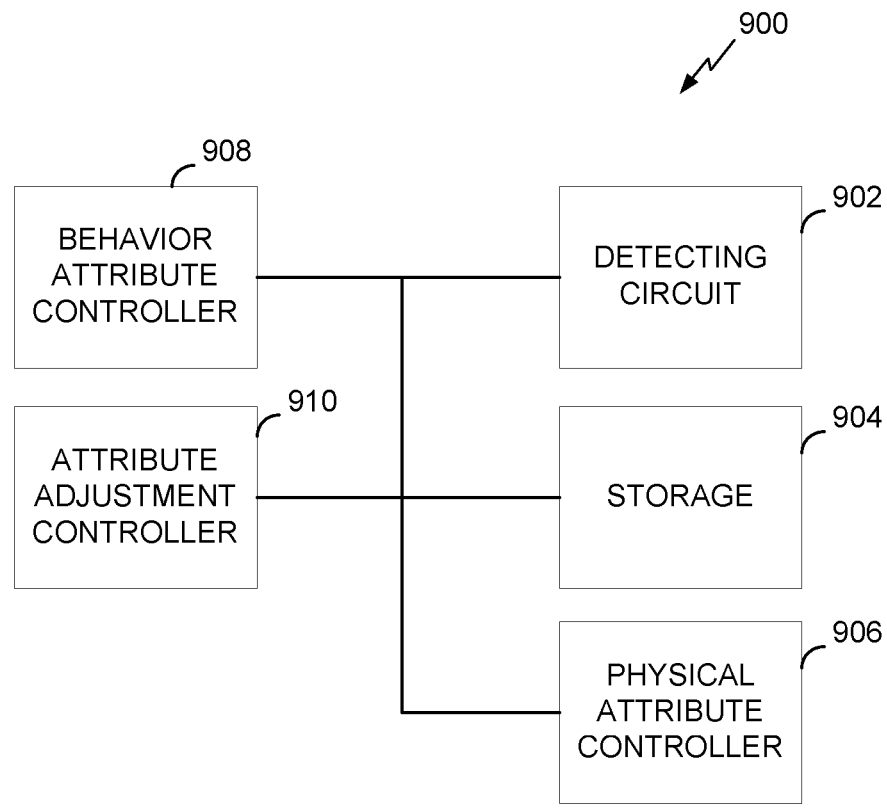
FIG. 9 is a flowchart illustrating a functional block diagram for another exemplary pseudo-genetic actor.

FIG. 9 is a block diagram illustrating another exemplary pseudo-genetic actor. The exemplary pseudo-genetic actor 900 may be configured to implement one or more of the methods described above. The pseudo-genetic actor 900 may be a physically instantiated actor (e.g., robot) or a virtual instantiation (e.g., manufacturing simulation, first person shooter simulation). If implemented virtually, the pseudo-genetic actor 900 may be represented in specialized circuitry, adapted to the simulated environment. Those skilled in the art will appreciate that a pseudo-genetic actor may have fewer or additional components than the simplified pseudo-genetic actor 900 shown in FIG. 9. The pseudo-genetic actor 900 includes a detecting circuit 902, a storage 904, a physical attribute controller 906, a behavior attribute controller 908, and an attribute adjustment controller 910.

In some implementations, the detecting circuit 902 is configured to detect information about the apparatus and an environment in which the apparatus is operating. The detecting circuit 902 may include one or more of a sensor, a memory, and a processor. In some implementations, the means for detecting information about the apparatus and an environment in which the apparatus is operating include the detecting circuit 902.

In some implementations, the storage 904 is configured to store the detected information. The storage 904 may include one or more of static memory, RAM, disk, and network storage. In some implementations, the means for storing detected information include the storage 904.

In some implementations, the physical attribute controller 906 is configured to maintain the physical attributes of the apparatus. In a physical instantiated actor, the physical attribute controller 906 may include actuators, pistons, hydraulics, and a processor. In a virtual instantiated actor, the physical attribute controller 906 may include a processor and a physical controller. In some implementations, the means for maintaining a physical attribute of the apparatus include the physical attribute controller 906.

In some implementations, the behavior attribute controller 908 is configured to maintain a behavior attribute of the apparatus. The behavior attribute controller 908 may include one or more of a processor, a memory, and a sensor. In some implementations, the means for maintaining a behavior attribute of the apparatus include the behavior attribute controller.

In some implementations, the attribute adjustment controller 910 is configured to determine adjustments a physical attribute and a behavior attribute based in part on the detected information and provide the adjustments to the physical controller and the behavior controller. The attribute adjustment controller 910 may include a processor, a memory, and a bus. In some implementations, the means for determining adjustments may include the attribute adjustment controller 910. Other As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A system for managing an autonomous actor network, the system comprising:
    a metadata collector configured to obtain metadata information associated with the autonomous actor network and autonomous actors included therein;
    an autonomous actor, said autonomous actor including a self-assessment identifier indicative of:
    metadata elements stored by the autonomous actor,
    a quantity of metadata information for each metadata element stored by the autonomous actor, and
    a relationship between the metadata elements for the autonomous actor and the quantity of metadata information stored for each metadata element, wherein the relationship includes a threshold result; and
    a processor configured to generate an assessment value for the autonomous actor based on the obtained metadata information and the self-assessment identifier, wherein the processor is configured to generate the assessment value at least in part by comparing the threshold result to a combination of the metadata elements for the autonomous actor and the quantity of metadata information stored for each metadata element in accordance with an identified process.

2. The system of claim 1, wherein the metadata information associated with the autonomous actor network comprises at least one of network size, time, physical parameter, or boundary condition for the autonomous actor network.

3. The system of claim 1, wherein metadata information associated with autonomous actors comprises one or more of:
    a measurement of a height, a width, a weight, a total surface area, a speed, an armor thickness, an engine output, a battery life, color, and a property indicating how the actor interacts with the autonomous actor network;
    a classification based at least in part on the measurement; or
    a calculation based at least in part on the measurement.

4. The system of claim 1, wherein the self-assessment identifier comprises a pseudo-gene.

5. The system of claim 1, wherein the relationship identifies the process for combining the indicated metadata elements.

6. The system of claim 1, further comprising a genetic processor configured to alter the self-assessment identifier for said autonomous actor based in part on the assessment value.

7. The system of claim 6, wherein altering said self-assessment identifier comprises at least one of changing the metadata elements for the autonomous actor, the quantity of metadata information stored by the autonomous actor, or the relationship between the metadata elements for the autonomous actor and the quantity of metadata information stored for each metadata element.

8. The system of claim 6, wherein said altering is based on a control-sequence including one or more values indicating which actors of the plurality of autonomous actors will contribute to the self-assessment identifier and a contribution from each of the indicated actors.

9. The system of claim 1, wherein the autonomous actor comprises a physical device having a memory configured to store the self-assessment identifier.

10. The system of claim 1, wherein the autonomous actor comprises a virtual actor instantiated by an electronic device, the virtual actor configured to store the self-assessment identifier in a portion of a memory in communication with the electronic device.

11. The system of claim 1, wherein the assessment value identifies a quantity of an overall goal achieved by the associated autonomous actor.

12. A method of managing an autonomous actor network, the method comprising:
    obtaining, by a network management computing system comprising computer hardware, metadata information associated with the autonomous actor network and autonomous actors included therein;
    associating, by the network management computing system, a self-assessment identifier with an autonomous actor, the self-assessment identifier indicative of:
    metadata elements stored by the autonomous actor,
    a quantity of metadata information for each metadata element stored by the autonomous actor, and
    a relationship between the metadata elements for the autonomous actor and the quantity of metadata information stored for each metadata element, wherein the relationship includes a threshold result; and
    generating, by the network management computing system, an assessment value for the autonomous actor based on the obtained information and the self-assessment identifier, wherein generating the assessment value includes comparing the threshold result to a combination of the metadata elements for the autonomous actor and the quantity of metadata information stored for each metadata element in accordance with an identified process.

13. The method of claim 12, wherein the self-assessment identifier comprises a pseudo-gene.

14. The method of claim 12, wherein the relationship identifies the process for combining the indicated metadata elements.

15. The method of claim 12, further comprising altering the self-assessment identifier for said autonomous actor based in part on the assessment value.

16. The method of claim 15, wherein altering said self-assessment identifier comprises at least one of changing the metadata elements for the autonomous actor, the quantity of metadata information stored by the autonomous actor, or the relationship between the metadata elements for the autonomous actor and the quantity of metadata information stored for each metadata element.

17. The method of claim 15, wherein the altering is based on a control-sequence including one or more values indicating which actors of the plurality of autonomous actors will contribute to the self-assessment identifier and a contribution from each of the indicated actors.

18. A non-transitory computer-readable storage medium comprising instructions executable by a processor of an apparatus to cause the apparatus to:
    obtain metadata information associated with an actor network and autonomous actors included therein;

associate a self-assessment identifier with an autonomous actor, the self-assessment identifier indicative of:

metadata elements stored by the autonomous actor, a quantity of metadata information for each metadata element stored by the autonomous actor, and a relationship between the metadata elements for the autonomous actor and the quantity of metadata information stored for each metadata element, wherein the relationship includes a threshold result; and generate an assessment value for the autonomous actor based on the obtained information and the self-assessment identifier, wherein generating the assessment value includes comparing the threshold result to a combination of the metadata elements for the autonomous actor and the quantity of metadata information stored for each metadata element in accordance with an identified process.

* * * * *